United States Patent Office 3,260,004
Patented July 12, 1966

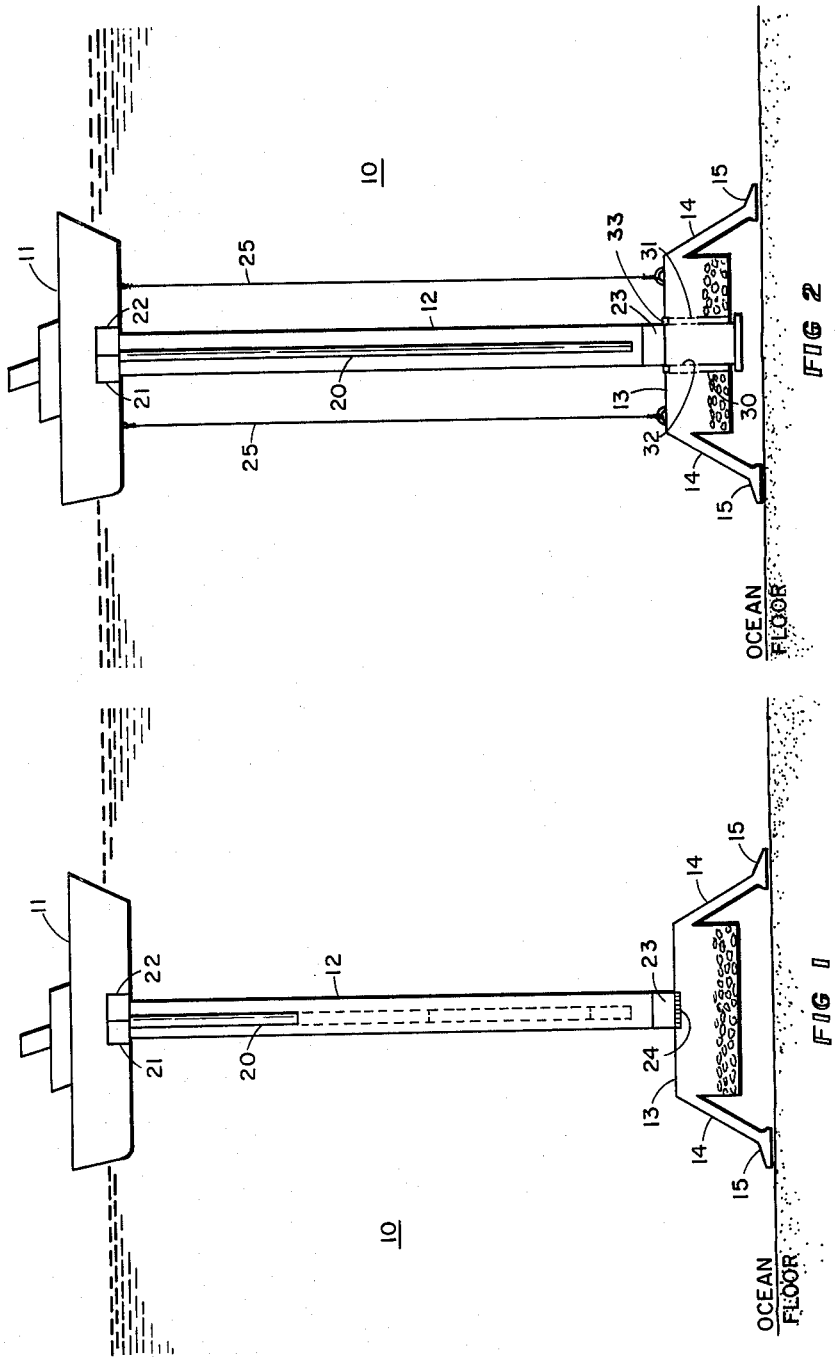

3,260,004
DEEP-SEA MINING METHOD
Warren B. Brooks, Dallas, Tex., assignor to Mobil Oil Corporation, a corporation of New York
Filed Sept. 9, 1963, Ser. No. 307,631
6 Claims. (Cl. 37—195)

This invention relates to the mining of minerals. More specifically, this invention relates to a method and apparatus for deep-sea mining wherein minerals are collected from the surface of the ocean floor.

During recent years, it has become more apparent to those concerned with supplying the world's mineral needs that the supply of minerals available on land bodies is rapidly being exhausted. In seeking solutions to the problems of these depleting minerals, the world's vast bodies of water have been suggested as probable future sources of mineral supply. The findings of exploration ventures carried out in some of the oceans indicate extremely large quantities of mineral-bearing materials are available on the ocean floor.

Suggestions for the recovery of materials from the ocean floor range from the use of a sledlike bin which is dragged along the floor to the employment of equipment resembling a vacuum cleaner in which ocean water is drawn through pickup arms into a central tube and on to the surface where minerals from the ocean floor entrained in the water are removed. In this latter form of equipment, pumps are generally located well down within the water and are required to pump large quantities of the ocean water from the floor to the surface in order to recover the desired material. Such equipment and methods will, of course, demand large quantities of power.

It is an object of the present invention to provide a method and apparatus for recovering mineral-bearing materials from the ocean floor. It is another object of the invention to provide such a method and apparatus wherein the quantity of water which must be raised to the surface in order to recover the minerals is minimized. These and further objects of the invention will be apparent from the following description taken in conjunction with the accompanying drawings.

In accordance with the present invention, mineral-bearing materials are recovered from the ocean floor by use of a bin provided with floor-contacting pickup arms. The bin is suspended near the ocean floor by means of a conduit supported by buoyant means such as a floating vessel. Air compressor and water pump means connected into the conduit are supported on the floating vessel. A valve located at the lower end of the conduit controls flow of water into the conduit from the sea. With the conduit air-filled, the valve is opened, allowing sea water to flow through the pickup arms and bin into the conduit with the sea water carrying mineral-bearing materials from the sea floor and depositing them in the bin. This procedure is repeated, if necessary, until the bin is filled to the desired level, at which time the bin is raised to the surface and emptied.

In the drawings:

FIGURE 1 illustrates in diagrammatic form one combination of apparatus which may be employed in carrying out the invention.

FIGURE 2 illustrates in diagrammatic form another form of apparatus which may be used in carrying out the invention.

Reference is now made to the drawings wherein identical reference numerals are employed to denote similar portions of the apparatus in each figure of the drawings. Referring specifically to FIGURE 1, reference numeral 10 denotes a body of ocean or sea water in which a mining operation in accordance with the method of the invention is carried out. Vessel 11, floating on the surface of water 10, is any form of seaworthy craft or floating platform which can support the necessary equipment for carrying out the invention. For example, vessel 11 might be similar to the large, intricate ships now being used for offshore drilling, such as is illustrated at pages 98–120 of The Oil and Gas Journal, May 27, 1963. Such a ship, which may be anchored and rotated a full 360°, is provided with a central well arrangement through which operations such as the method of the invention might be carried out. On the other hand, ship 11 may also be a small, inexpensive vessel. Suspended from ship 11 toward the ocean floor is a first conduit 12 which serves both as a low pressure chamber, as will be discussed hereinafter, and as a support for bin 13 in which the minerals from the ocean floor are collected. A plurality of pickup arms 14 are connected to the bin. Each of the pickup arms has a head 15 which contacts the ocean floor for collecting the desired minerals from the surface of the floor. Suspended within conduit 12 is a second conduit 20. Vessel 11 is provided with a compressor 21 and a pump 22, both of which are so connected that either of them may be placed in communication with conduit 20 as desired. Located at the lower end of conduit 12 is a valve 23 which is used to control the flow of sea water into conduit 12. Valve 23 may be any form of valve which may be remotely operated from the ship at the surface. Bin 13 is provided with a screen 24 which prevents flow of mineral deposits from the bin into conduit 12.

The relative sizes of ship 11, the conduits, and the bin as shown in the drawings are not intended to be necessarily typical of an operating combination. The sizes of these various components of the combination obviously will vary depending upon such factors as water depth and the actual magnitude of the operation intended to be carried out with the apparatus. The construction of the particular form of conduits 12 and 20 employed will vary depending upon the demands which will be placed upon the apparatus. If the operation is small, conduits 12 and 20 might be formed of flexible hose material. Also, conduit 12 might be constructed of sections of casing similar to that used in oil wells, and conduit 20 might be formed of sections of drill pipe or production tubing. It will be evident that in large-scale operations the conduits may comprise quite large sections of heavy pipe as are currently used in various forms of marine operations.

The method of the invention illustrated in FIGURE 1 is carried out in the following manner. Bin 13 with its pickup arms 14 is secured to the lower end of conduit 12 and lowered through water 10 until the bin is at a position adjacent the ocean floor such that the heads 15 of the pickup arms will be resting on the surface of the ocean floor. During the lowering of the bin, valve 23 generally is in an open position to allow conduit 12 to fill with ocean water, though the valve may be closed to allow the conduit to be installed air-filled or dry if the bouyancy of the conduit is not too great. Determination of the proper positioning of the bin may be accomplished in several ways, such as the use of a television camera mounted on the bin in a fashion similar to the way television cameras are now being used in the drilling of deepwater oil wells. With the conduit 12 extended to the depth necessary to properly position the bin, conduit 20 is lowered into conduit 12 to a predetermined depth as represented by the solid line showing of the conduit in FIGURE 1. Conduit 20 is connected to compressor 21 so that the compressor may deliver air into the conduit. The depth to which conduit 20 is first lowered into conduit 12 will be dependent upon the capacity of the compressor. If the conduit is initially water-filled, air is then rapidly pumped by the compressor into conduit 20 for the purpose of evacuating the sea water from within conduit 20 and from the annular space between conduit 20 and conduit 12 above the lower end of conduit 20. The air will move downwardly through conduit 20, spill out around the lower end of the conduit, and up through the annular space between conduit 20 and conduit 12. With sufficiently rapid pumping of the air, the water within conduit 20 and around the conduit in the annular space between conduit 20 and conduit 12 will be removed. The water is essentially blown from the upper end of conduit 12 at the surface. When it appears that water is no longer being blown from the conduits, the air pressure is retained within the conduits and conduit 20 is lowered another predetermined distance into conduit 12, at which time the procedure is repeated until the water within and around conduit 12 is again blown from the conduits. The alternate lowering of conduit 20 and the blowing of the water from the conduits is continued until conduit 20 has been extended downwardly to the lower end of conduit 12 and both conduits 12 and 20 have been completely evacuated of the sea water. Various positions of the conduit 20 as it is lowered are represented by the broken lines in FIGURE 1. Valve 23 is now moved to a wide-open position, allowing sea water to rapidly pass through heads 15, pickup arms 14, bin 13, through screen 24 into the conduits. The sea water carries with it the mineral deposits through the pickup arms into the bin where they are deposited. Screen 24 prevents flow of the mineral deposits from the bin into the conduits. The procedure of evacuating the conduits and subsequently allowing the sea water to flow into the conduits as just described is carried out until bin 13 is filled or the mineral deposits have come up to a chosen predetermined level. In order to achieve this, it may be necessary that the conduits be evacuated and refilled several times. A determination of when the bin is filled to the desired level may be arrived at by several different means. A mechanical sensing device may be constructed within the bin and arranged to telemeter the information to the surface vessel. The weight of the bin when filled to the desired level with mineral deposits, together with the weight of the conduits, may be determined and weight measuring means installed in the surface vessel to indicate when the bin contains the desired quantity.

If the conduit had been initially lowered in a dry, air-filled condition, the first flow of deposits into the bin would be effected simply by opening the valve 23. Subsequent evacuation of the air and filling the bin would be carried out as just described.

When it has been ascertained that bin 13 is filled to the desired level with the mineral deposits, the bin is lifted to the surface and emptied. Removal of the bin to the surface may be done by lifting the conduit 12, with the conduit being disconnected section by section as it is withdrawn through the water in a manner similar to the withdrawal of a drill bit from a wellbore.

In another embodiment of the method of the invention, conduit 20 is initially lowered until its lower end is substantially at the bottom of conduit 12, as illustrated by the lowermost broken line in FIGURE 1. Air is then pumped into conduit 20 until the capacity of compressor 21 has been reached. This may be determined by use of a flow meter on the compressor which will indicate the time at which air is no longer flowing into the conduit, thus showing when the capacity of the compressor has been reached. Obviously the air must rapidly be pumped into the conduit inasmuch as its function is to displace the water within the conduit downwardly and consequently displace some of the water within the annulus between conduits 12 and 20 outwardly from conduit 12 at the surface. If the capacity of the compressor is 500 p.s.i., it will have the ability to displace the water within conduit 20 downwardly approximately 1000 feet. At the time air ceases to flow into the conduit, communication of the conduit with the compressor is terminated and the conduit is connected into the pump. Water containing a surfactant, such as a condensate of nonyl phenol with 30 mols of ethylene oxide, or a similar surfactant or foaming agent, is then pumped into the conduit at a sufficiently rapid rate to trap the previously introduced air and drive the air as an elongated air bubble downwardly through the conduit. The water-surfactant mixture is pumped into conduit 20 until the column of mixture within the conduit is long enough that its weight reduces the pressure within the conduit at the surface to a predetermined low value, which may be substantially atmospheric. With the pressure at the top of the conduit thus reduced, the air compressor will be capable of again pumping in a bubble of air. A second column of air is then forced by the compressor into conduit 20 until the capacity of the compressor is again reached. It will be recognized that during the procedure just described, the first air bubble which was introduced into the conduit will be displaced further downwardly through the conduit. When the first air bubble reaches the bottom of conduit 20, it will spill out around the lower end of the conduit into the annular space between conduits 12 and 20 and thus will move up through the annular space to the surface at a very rapid rate, during which time it will also expand and effect the blowing of water out of conduit 12 at the surface. Following the expulsion of the first air bubble from conduit 12 at the surface, the first slug of water and surfactant will be similarly displaced from the conduit at the surface. The rise of the foamy or frothy mixture of water and surfactant within the annular space will result not only in the removal of the slug of water-surfactant mixture from the conduit, but also will carry with it additional water picked up by the mixture in the conduit. Alternate slugs of air and the water-surfactant mixture are introduced into conduit 20 until all of the water has been displaced from both conduit 20 and the annular space between conduit 20 and conduit 12. During this procedure when the time arrives that the column of alternate air and water-surfactant slugs in the annular space is sufficiently low in weight that the back pressure against the compressor within conduit 20 is less than 500 p.s.i., the compressor will have the capacity to completely evacuate the conduits. This point will be self-determining by the fact that at the stage in the procedure when this condition is established, the compressor will simply continue to pump air into conduit 20. Stated otherwise, when observation of the air flow rate meter indicates that, rather than the flow of air stopping, the flow of air is continuing, the point has been reached when the compressor will completely evacuate the conduits. It will be evident to those skilled in the art that the procedure of introducing alternate slugs of air and water-surfactant slugs must be carried out in a rapid, continuous fashion in order to effectively displace all of the sea water from the conduits. Stopping the procedure or pumping at a very low rate would result in the system within the conduits equilibrating and thus causing the air to remain at the top within conduit 20.

When the conduits are completely evacuated by this procedure, valve 23 is opened, allowing sea water to rush through the bin into the conduits with the minerals being deposited within the bin in the manner previously discussed. The procedure of using alternate slugs of air and water-surfactant is continued with alternate evacuation of the conduits until the bin has been filled to the desired level. The bin is then removed to the surface for emptying.

FIGURE 2 illustrates a combination of apparatus which will permit bin 13 to be removed to the surface without the withdrawal of conduit 12. Referring specifically to FIGURE 2, a plurality of cables 25 extend between vessel 11 and bin 13 for purposes of both supporting the bin and raising and lowering the bin. Extending through bin 13 is a well 30 which is provided along a portion of its length with a screen element 31 to prevent the mineral-bearing materials from flowing from the bin into conduit 12. In this particular embodiment, conduit 12 extends through bin 13 with the conduit being positioned through the well 30. In lieu of using screen 24, conduit 12 is either perforated along a portion of its length within the well 30 or is provided with a screen 32 which will allow flow of sea water into the conduit and yet will prevent the entry of mineral-bearing materials into the conduit from the bin. The tolerance in the fitting between the portion of conduit 12 extending through well 30 and the internal dimension of well 30 is such that the bin may be raised and lowered around the conduit. A seal 33 is provided between the bin and conduit to minimize sea water leakage around the conduit into the bin which would tend to bypass the intake heads and pickup arms.

In utilizing the equipment combination shown in FIGURE 2, bin 13 will first be suspended below the vessel 11 and conduit 12 will be extended into water 10 toward the ocean floor to its full length. Bin 13 will then be lowered by means of cables 25 to operating depth adjacent the ocean floor, as previously discussed. When bin 13 has been filled with mineral-bearing materials to the desired extent, the bin is then raised by means of cables 25 to the surface with conduit 12 remaining intact. The bin simply slides upwardly over the conduit. It will be evident that the combination of apparatus shown in FIGURE 2 may be used with either of the embodiments of the method of the invention previously discussed. In other words, in using the apparatus of FIGURE 2, conduit 20 may be progressively lowered in steps, with the water within the conduits being blown out by air; or, the conduit 20 may be lowered to its full depth initially and the water removed from the conduits by the use of the alternate slugs of air and water-surfactant.

If the mining operation is being carried out in sufficiently shallow water, conduit 20 may be lowered to the fullest extent initially and the compressor alone may be adequate to exhaust the sea water from the conduits in one step. The valve would then be opened to allow entry of water into the conduits for depositing minerals in the bin.

Bin 13 and its associated pickup arms 14 and heads 15 will generally be moved along the ocean floor by maneuvering of surface vessel 11. Flexibility of the pickup arms will effectively compensate for any rise and fall of the bin due to surface conditions, such as wind and wave action, encountered by vessel 11. Rise and fall of the vessel could also be compensated for by use of a slip joint in the conduits.

Having thus described the invention it will be apparent that other modifications within the scope of the invention will occur to those skilled in the art and it is intended that the invention be limited only within the limits of the following claims.

What is claimed is:
1. In apparatus for mining mineral materials from the ocean floor, the combination which comprises:
(a) buoyant means adapted to float at the surface of a body of water;
(b) conduit means extending downwardly from said buoyant means through said body of water toward the floor thereof;
(c) valve means at the lower end of said conduit to control the flow of water into the lower end of said conduit;
(d) means at the lower end of said conduit for preventing flow of mineral materials into said conduit;
(e) bin means supported on the lower end of said conduit means, said bin means being provided with well means for receiving said conduit means so that said bin means may be lifted upwardly around said conduit means;
(f) a plurality of cables extending from said bin means to said buoyant means;
(g) means connected to said bin means for picking up said mineral materials from said floor and conducting said materials into said bin means; and
(h) means supported on said buoyant means for evacuating water from said conduit means.

2. In apparatus for mining mineral materials from an ocean floor, the combination which comprises:
(a) buoyant means adapted to float at the surface of said ocean;
(b) a first conduit supported by said buoyant means and extending downwardly through the ocean toward the floor thereof;
(c) a second conduit supported within said first conduit adapted to be positioned with the lower end thereof in the vicinity of the lower end of said first conduit;
(d) air compressor means supported by said buoyant means and adapted to be connected into said second conduit;
(e) water pump means supported by said buoyant means and adapted to be connected into said second conduit;
(f) a valve at the lower end of said first conduit to control the flow of ocean water into the lower end of said first conduit;
(g) means at the lower end of said first conduit to prevent flow of mineral materials into said first conduit;
(h) a bin secured to and supported by the lower end of said first conduit for receiving mineral materials collected from said ocean floor; and
(i) a plurality of pickup arms having ocean floor-contacting heads thereon secured to said bin for removing mineral materials from said ocean floor and conducting said materials into said bin.

3. Apparatus in accordance with claim 2 wherein said first conduit is adapted to extend through said bin to permit said bin to be raised upwardly to the surface around said first conduit which includes means extending through said bin providing a well through which said first conduit may slide, means along a portion of the length of said well to prevent said mineral materials from flowing from said bin into said well, and cable means extending between said buoyant means and said bin for raising and lowering said bin between said ocean floor and said surface around said first conduit.

4. In a method of collecting mineral deposits from the ocean floor wherein a bin having floor-contacting pickup heads is suspended near said ocean floor on a conduit provided with a valve in the lower end thereof and supported by buoyant means floating at the ocean surface, the steps which comprise:
(a) allowing said conduit to fill with ocean water during positioning of said bin and said conduit;
(b) closing said valve to prevent flow of said water between said conduit and said bin;
(c) removing said water from said conduit until said conduit is substantially filled with air;
(d) opening said valve to permit said water to flow through said pickup heads and said bin into said conduit until said conduit is substantially filled with said water, said water being allowed to flow at a rate sufficient to entrain mineral deposits from said floor and deposit said mineral deposits in said bin;
(e) repeating steps (b) and (c) until said bin is filled to a predetermined level with said mineral deposits; and
(f) raising said bin to the surface of said ocean for removal of said mineral deposits from said bin.

5. In a method of collecting mineral deposits from the ocean floor wherein a bin having floor-contacting pickup heads is suspended near said ocean floor on a conduit provided with a valve in the lower end thereof and supported by a floating vessel, the steps which comprise:
(a) lowering a second conduit into said first conduit to a predetermined depth, said first conduit being filled with ocean water;
(b) rapidly pumping air through said second conduit into said first conduit until all of said water within said second conduit and in the annular space between said first conduit and said second conduit has been removed at the surface from said first conduit.
(c) again lowering said second conduit through said first conduit a predetermined distance and repeating step (b) to remove a further quantity of said water from said conduits;
(d) continuing the lowering of said second conduit and the removal of said water in accordance with the aforementioned steps until said second conduit has been lowered to substantially the lower end of said first conduit and substantially all of said water has been removed from said conduits;
(e) opening said valve to permit ocean water to flow through said pickup heads and said bin into said conduits until said conduits are substantially filled with ocean water whereby mineral deposits are carried into said bin;
(f) continuing the aforementioned steps until said bin has been filled with mineral deposits to a predetermined level; and
(g) lifting said bin to the surface for removal of said mineral deposits.

6. In a method of collecting mineral deposits from the ocean floor wherein a bin having floor-contacting pickup heads is suspended near said ocean floor on a conduit provided with a valve in the lower end thereof and supported by a floating vessel, the steps which comprise:
(a) lowering a second conduit into said first conduit until the lower end of said second conduit is in the vicinity of the lower end of said first conduit, said first conduit being filled with ocean water;
(b) closing said valve at the lower end of said first conduit to prevent flow of ocean water into said first conduit;
(c) pumping air into the upper end of said second conduit until the flow rate of said air into said conduit is reduced to substantially zero whereby said water in said second conduit is displaced downwardly and a portion of said water in said first conduit around said second conduit has been displaced from said first conduit at the surface;
(d) pumping a water-surfactant mixture into the upper end of said second conduit until the pressure at the upper end of said second conduit has been reduced to a predetermined low level whereby the air previously introduced into said second conduit has been displaced downwardly as a bubble;
(e) repeating steps (c) and (d) alternately until substantially all of said ocean water and the quantities of water-surfactant mixtures introduced have been displaced from said conduits at the surface and said conduits are substantially filled with air;
(f) opening said valve to allow ocean water to flow through said pickup heads and said bin into said conduits at a rate sufficient to carry mineral deposits from said ocean floor into said bin;
(g) repeating steps (c) through (f) until said bin is filled with mineral deposits to a predetermined level; and
(h) raising said bin to the surface for removal of said mineral deposits.

References Cited by the Examiner
UNITED STATES PATENTS

| | | | |
|---|---|---|---|
| 645,660 | 3/1900 | Bell | 37—59 |
| 898,927 | 9/1908 | Riddle | 37—59 |
| 1,198,255 | 9/1916 | Miller | 37—59 |
| 1,326,321 | 12/1919 | Callahan | 37—58 |
| 1,774,640 | 9/1930 | Dunn | 166—44 |
| 2,212,236 | 8/1940 | Hoerecke | 37—58 |
| 2,836,246 | 5/1958 | Hock | 166—3 |
| 2,942,663 | 1/1960 | Haggard | 166—45 |
| 3,102,548 | 9/1963 | Smith | 166—42 X |

ANTONIO F. GUIDA, *Acting Primary Examiner.*
BENJAMIN HERSH, ABRAHAM G. STONE,
*Examiners.*
G. T. MOLLER, J. O. BOLT *Assistant Examiners.*